United States Patent [19]
Kumberger et al.

[11] Patent Number: 6,051,163
[45] Date of Patent: Apr. 18, 2000

[54] CATALYST FOR STEAM-REFORMING METHANOL

[75] Inventors: Otto Kumberger; Michael Jolyon Sprague, both of Mannheim; Otto Hofstadt, Altrip, all of Germany

[73] Assignee: BASF Aktiengesellschaft, Ludwigshafen, Germany

[21] Appl. No.: 09/149,440

[22] Filed: Sep. 9, 1998

[30] Foreign Application Priority Data

Sep. 10, 1997 [DE] Germany ............................ 197 39 773

[51] Int. Cl.$^7$ .................... C07C 1/02; B01J 23/02; B01J 23/06; B01J 23/70; B01J 23/72
[52] U.S. Cl. .................... 252/373; 502/342; 502/343; 502/345; 502/346; 502/524
[58] Field of Search .................... 252/372, 373; 502/340, 341, 342, 343, 345, 346, 524

[56] References Cited

U.S. PATENT DOCUMENTS

| | | | |
|---|---|---|---|
| 3,850,850 | 11/1974 | Collins .................... | 252/465 |
| 3,923,694 | 12/1975 | Cornthwaite .................... | 502/342 |
| 4,913,842 | 4/1990 | Yoneoka et al. .................... | 252/373 |

FOREIGN PATENT DOCUMENTS

| | | |
|---|---|---|
| 152314 | 8/1985 | European Pat. Off. . |
| 19534434 | 9/1995 | Germany . |
| 58193738 | 5/1982 | Japan . |
| 07024320 | 7/1993 | Japan . |

OTHER PUBLICATIONS

*Pat. Abst. of Japan*, vol. 15, No. 197.
*Pat. Abst. of Japan*, vol. 95, No. 4.

*Primary Examiner*—Steven P. Griffin
*Assistant Examiner*—Maribel Medina
*Attorney, Agent, or Firm*—Keil & Weinkauf

[57] ABSTRACT

In a process for steam-reforming methanol, in which methanol and water are reacted at a catalyst with formation of hydrogen, the catalyst used can be prepared by (a) precipitating a solution of zinc salts and aluminum salts, the atomic ratio of Zn:Al being from 3:1 to 1:3, with an alkali metal carbonate solution or alkali metal hydroxide solution at a pH in the range from 5 to 12 and at from 20 to 100° C., (b) separating off and washing the precipitate to remove alkali metal ions, (c) drying the precipitate, (d) calcining the precipitate at from 250 to 800° C. to give a mixed oxide, (e) dispersing the mixed oxide in an acidic solution of copper salts and zinc salts, the atomic ratio of Cu:Zn being from 1:5 to 20:1 in the solution, (f) precipitating the dispersion with an alkali metal carbonate solution or alkali metal hydroxide solution at a pH in the range from 6 to 9 and at from 20 to 100° C., (g) carrying out the steps (b) to (d), the solutions in steps (a) and/or (e) can additionally comprise salts or oxides of one or more elements selected from the group consisting of the platinum metals, groups 4, 5, 11 and the lanthanides of the Periodic Table of the Elements, or the salts or oxides can be applied to the mixed oxides.

14 Claims, No Drawings

CATALYST FOR STEAM-REFORMING METHANOL

The present invention relates to a process and a catalyst for steam-reforming methanol.

In the steam reformation of methanol, methanol is reacted with water to give hydrogen and carbon dioxide and also carbon monoxide. In addition to industrial processes for synthesis gas production, in particular applications in mobile systems such as fuel cells are of importance. Fuel cells require hydrogen which can be produced by steam-reforming methanol. For vehicle drives or mobile fuel cells, for example, it is of importance here to be able to carry out the steam reformation in a small reactor of low weight. This is made possible, in particular, by catalysts which catalyze the reaction of methanol and water and have a high activity with low volume. In this case it is useful to make up the catalysts in tablet form, in which case the tablets are to have very small dimensions, in order to achieve a high bulk density and a high ratio of surface area to volume.

A variety of catalysts are known for steam-reforming methanol.

EP-A-0 152 314 describes a homogeneous catalyst composition which has copper, zinc and aluminum in oxidic form. The catalyst composition is prepared by precipitation of a solution, which comprises copper salts, zinc salts and aluminum salts, at a pH in the range from 6.3 to 7.3 using an alkali metal carbonate or an alkali metal hydroxide. After washing, drying and calcining the precipitate, an oxidic catalyst is obtained which enables a primary alcohol to be decomposed into a mixture of CO, $CO_2$ and hydrogen.

JP-A-58193738 describes a catalyst for steam-reforming methanol. The catalyst is prepared from gamma-aluminum oxide pellets by impregnation with a solution of zinc nitrate and copper nitrate, drying and calcination.

JP-A-07024320 relates to a catalyst for steam-reforming methanol. Basic copper carbonate hydroxide or oxide and zinc carbonate hydroxide or oxide are mixed with aluminum oxide hydrate. The resulting mixture is heated and reduced. The mixture is obtained by precipitation of an is aqueous solution of a water-soluble copper compound and a water-soluble zinc compound by alkali metal hydroxide solutions.

The catalysts described do not have a sufficiently high activity, based on the catalyst volume, for all applications.

It is an object of the present invention to provide catalysts for steam-reforming methanol which have a high catalyst activity, based on the catalyst volume, and are thus usable with advantage, in particular for mobile applications in fuel cells. In addition, a corresponding process for steam-reforming methanol is to be provided.

We have found that this object is achieved according to the invention by a process for steam-reforming methanol, in which methanol and water are reacted at a catalyst with formation of hydrogen, wherein the catalyst can be prepared by (a) precipitating a solution of zinc salts and aluminum salts, the atomic ratio of Zn:Al being from 3:1 to 1:3, with an alkali metal carbonate solution or alkali metal hydroxide solution at a pH in the range from 5 to 12 and at from 20 to 100° C.,
(b) separating off and washing the precipitate to remove alkali metal ions,
(c) drying the precipitate,
(d) calcining the precipitate at from 250 to 800° C. to give a mixed oxide,
(e) dispersing the mixed oxide in an acidic solution of copper salts and zinc salts, the atomic ratio of Cu:Zn being from 1:5 to 20:1 in the solution,
(f) precipitating the dispersion with an alkali metal carbonate solution or alkali metal hydroxide solution at a pH in the range from 6 to 9 is and at from 20 to 100° C.,
(g) carrying out the steps (b) to (d), the solutions in steps (a) and/or (e) can additionally comprise salts or oxides of one or more elements selected from the group consisting of the platinum metals, groups 4, 5, 11 and the lanthanides of the Periodic Table of the Elements, or the salts or oxides can be applied to the mixed oxides.

In addition, the invention also relates to some of the catalysts used in the process above. It relates to a catalyst which can be prepared by (a) precipitating a solution of zinc salts and aluminum salts, the atomic ratio of Zn:Al being from 1.1:1 to 3:1, with an alkali metal carbonate solution or alkali metal hydroxide solution at a pH in the range from 5 to 12 and at from 20 to 100° C.,
b) separating off and washing the precipitate to remove alkali metal ions,
c) drying the precipitate,
d) calcining the precipitate at from 250 to 800° C. to give a mixed oxide,
e) dispersing the mixed oxide in an acidic solution of copper salts and zinc salts, the atomic ratio of Cu:Zn being from 1:5 to 20:1 in the solution,
(f) precipitating the dispersion with an alkali metal carbonate solution or alkali metal hydroxide solution at a pH in the range from 6 to 9 and at from 20 to 100° C.,
(g) carrying out the steps (b) to (d), the solutions in steps (a) and/or (e) can additionally comprise salts or oxides of one or more elements selected from the group consisting of the platinum metals, groups 4, 5, 11 and the lanthanides of the Periodic Table of the Elements, or the salts or oxides can be applied to the mixed oxides.

According to the invention it has been found that Cu—Zn—Al—oxide catalysts have a high activity at low temperatures, a low loss of activity over the service life of the catalyst and high mechanical strength. The activity of the catalyst, based on the catalyst volume, is greater here than the activity of known Cu—Zn—Al—oxide precipitated catalysts which are obtained by coprecipitation of the three components under basic conditions. The two-stage precipitation according to the invention produces catalysts which have an advantageous profile of properties.

In the case of Cu—Zn—Al—oxide catalysts, the activity and loss of activity of a catalyst over time can be greatly influenced by varying the precipitation conditions and the precipitation method. It has been found that particularly active methanol reformation catalysts having lasting activity can be obtained according to the invention by mixing the three components copper, zinc and aluminum not in one step, but first producing a Zn—Al—mixed oxide compound which is then converted by calcination into an at least partly acid-insoluble phase, suspending this phase in acidic solution and then producing a Cu—Zn mixed oxide compound in the presence of this phase. For the purposes of the invention, mixed oxide compounds are oxide, hydroxide and also carbonate and carbonate hydroxide compounds.

In step (a), a solution of zinc salts and aluminum salts, the atomic ratio of Zn:Al being from 1:3 to 3:1, preferably from 1.1:1 to 3:1, particularly preferably from 1.3:1 to 3:1, in particular from 1.2:1 to 1.5:1, with an alkali metal carbonate or alkali metal hydroxide solution, preferably sodium carbonate or sodium hydroxide solution, at a pH in the range from 5 to 12, preferably from 5.5 to 9, particularly preferably from 6 to 7, and at from 20 to 100° C., preferably from 30 to 70° C., particularly preferably from 30 to 50° C.

Zinc salts and aluminum salts which can be used are all salts which are soluble in aqueous systems, preferably the corresponding nitrates.

Zn—Al mixed oxide compounds which are produced are, in particular, oxide compounds such as spinels or spinel zinc oxide compounds. If the atomic ratio of Zn:Al is 1:2, spinels are formed predominantly or exclusively. If there is an atomic excess of Zn over Al, spinel zinc oxide compounds or metal oxide spinel mixed phases are formed. The latter are particularly preferred.

The precipitation product obtained or the precipitate obtained is separated off from the reaction mixture in step (b), generally filtered off, and very substantially freed from alkali metal ions, generally alkali metal salts, by washing the precipitate. Drying the resulting precipitate in step (c) is followed in step (d) by calcination of the precipitate at from 250 to 800° C., preferably from 300 to 600° C., particularly preferably from 400 to 500° C., to form a mixed oxide, as described above.

The resulting mixed oxide is then dispersed in step (e) in an acidic solution of copper salts and zinc salts. This solution is preferably an aqueous solution, as is also the solution used above. In the solution, the atomic ratio of Cu:Zn is from 1:5 to 20:1, preferably from 1:1 to 10:1, in particular from 2:1 to 7:1. The dispersion is then precipitated in step (f) with an alkali metal carbonate or alkali metal hydroxide solution at a pH in the range from 6 to 9, preferably from 6.5 to 8, particularly preferably from 6.7 to 7.5, and at from 20 to 100° C., preferably from 50 to 90° C., particularly preferably from 60 to 80° C. A Cu—Zn mixed oxide compound is precipitated, which, for the purposes of the invention, are also in particular Cu—Zn carbonate hydroxide compounds such as aurichalcite and malachite compounds. The Cu—Zn mixed oxide compound is preferably a Cu—Zn carbonate hydroxide compound having the malachite structure.

Overall, a mixed oxide of Zn—Al mixed oxide and Cu—Zn mixed oxide is obtained.

Thereafter, the steps (b) to (d) above are carried out as step (g). In this case, the temperature during drying is preferably from 20 to 400° C., particularly preferably from 50 to 200° C., in particular from 80 to 130° C. The calcination in this step is performed at from 200 to 800° C., preferably from 250 to 600° C., particularly preferably from 300 to 500° C.

The chemical composition of the catalysts prepared in this manner can vary within broad limits. Preferably, the atomic ratio of Cu:Zn is from 1:5 to 5:1, particularly preferably from 1:1 to 4:1, in particular from 2:1 to 3:1. The atomic ratio of (Cu+Zn):Al is preferably from 99:1 to 70:30, particularly preferably from 95:5 to 80:20. Special preference is given to a ratio of Cu:Zn:Al of about 65:25:10.

This corresponds to a composition of about 67% by weight of CuO, 26.4% by weight of ZnO and 6.6% by weight of $Al_2O_3$ in the finished catalyst.

The catalysts prepared according to the invention have, with the same gross chemical composition, a significantly higher initial activity for methanol reformation than systems prepared according to known processes by simultaneous coprecipitation of the three components Cu, Zn and Al.

In addition to the three elements Cu, Zn and Al, other elements can be introduced into the catalyst, such as platinum metals, elements of groups 4, 5, 11 and the lanthanides of the Periodic Table of the Elements. Preferred examples are Pd, Pt, Rh, Ru, Os, Au, Zr, Ti, V, Nb, Ta and the lanthanides. They can, for example, be added to the solutions in steps (a) and/or (e) in the form of salts or oxides, or be applied to the mixed oxides as salts or oxides (impregnation or coprecipitation in at least one of the two precipitation stages).

A particularly preferred catalyst has the following properties:

Dispersion in 30% strength nitric acid results in an acid-insoluble residue.

This can be a crystalline compound having spinel structure (zinc spinel or Cu—Zn spinel), or else an amorphic acid-insoluble compound. In contrast, dissolving known Cu—Zn—Al—oxide catalysts gives a clear solution.

No phase comprising all three elements is present in the dried catalyst precursor in step (g) prior to the final calcination. A Zn—Al phase and a Cu—Zn phase are present. The Zn—Al phase is preferably a spinel phase, and the Cu—Zn phase is preferably a Cu—Zn—malachite mixed crystal compound. Both compounds can generally be detected in the XRD spectrum. In the known catalysts obtained by coprecipitation, a Cu—Zn—Al mixed oxide phase is present, which is generally a hydrotalcite phase, as can be seen in the XRD spectrum.

The catalysts according to the invention can be made up into any suitable form. The active composition can be used in the form of catalyst shaped bodies, as monolith or as catalytically active layer applied to a support (metal or ceramic). The catalysts generally used for compact methanol reformers are size fractions of chips. A particularly mechanically stable catalyst pellet form, in contrast, is produced by tableting the catalyst powder. In order to achieve good packing behavior of the catalyst pellets, tablets are preferably used which have a diameter from 0.8 to 5 mm, preferably from 0.8 to 2.0 mm, in particular from 1.0 to 1.8 mm and a height from 0.8 mm to 5 mm, preferably from 0.8 to 2.0 mm, in particular from 1.0 to 1.8 mm. Particular preference is given to tablets having a diameter of 1.5 mm and a height of about 1.5 mm. By tableting the catalysts according to the invention to form tablets of this small size, excellent mechanical strength of the tablets can be achieved, which is associated with outstanding packing behavior in the catalyst bed.

Before the catalyst is used in a methanol reformation reactor, or during the use therein, the copper oxide is at least partially converted into metallic copper in the catalyst. This can be achieved, for example, by reduction with hydrogen or a methanol/steam mixture.

The steam reformation of methanol is preferably carried out in this case at a pressure of from 1 to 25 bar, particularly preferably from 1 to 5 bar and at from 180 to 400° C., particularly preferably from 200 to 350° C. The molar ratio of water to methanol is preferably 1:1 to 2:1, particularly preferably about 1.5:1.

The examples illustrate the invention.

EXAMPLES

Catalyst Preparation

Comparative Example 1

Copper nitrate (345.3 g of a 15.5% by weight Cu-containing solution of copper nitrate in nitric acid), zinc nitrate (146.1 g of a 14.5% by weight Zn-containing zinc nitrate solution in nitric acid) and aluminum nitrate (48.6 g of aluminum nitrate nonahydrate, Merck) are dissolved in 3.5 l of water. The amounts of the three nitrate salts are selected in such a manner that the solution has a total atomic ratio of Cu:Zn:Al=65:25:10. A solution of 474 g of sodium carbonate $Na_2CO_3$ in 2 l of water is mixed with the copper zinc aluminum nitrate solution described, with stirring, at a precipitation pH of 6.8 and a precipitation temperature of 70° C. The feed rate of sodium carbonate and the copper zinc aluminum solutions is controlled during the precipitation process in such a manner that the precipitation pH is kept constant from 6.7 to 6.9 during the entire precipitation. The precipitation is performed in a 1 l precipitation vessel which is stirred intensively (approximately 480 rpm).

The resulting precipitation suspension is continuously transferred via an overflow into a collecting vessel which is stirred at 150 rpm. After completion of the precipitation, the resulting suspension is stirred for a further 15 min at 70° C. The precipitated product is then washed free of nitrate, dried for 16 h at 120° C. and the resulting product is calcined for 2 h under air at 350° C. The material (gross catalyst composition based on oxides: approximately 67% by weight of CuO, 26.4% by weight of ZnO, 6.6% by weight of $Al_2O_3$) is admixed with 2% of graphite, compacted in an eccentric press to solid tablets (20 mm ×3 mm), and the solid tablets are comminuted to give chippings having a grain size fraction of 1.6–2.5 mm. The catalyst has a BET surface area of 94 $m^2/g$. The total pore volume is 0.344 ml/g.

Example 2

Preparation of the Zn—Al mixed oxide

The precipitation is performed by introducing a Zn—Al—nitrate solution, which was obtained by dissolving 320 g of $Zn(NO_3)_2.6H_2O$ and 336.4 g of $Al(NO_3)_3.9H_2O$ in 600 ml of water, and a 20% strength by weight $Na_2CO_3$ solution into a precipitation vessel from two separate reservoir vessels. The rate of addition of the Zn—Al—nitrate solution is controlled in such a manner that a pH from 6.7 to 6.9 is maintained in the precipitation vessel over the entire precipitation time. The temperature during the precipitation is 50° C. The precipitation is performed in a 500 ml precipitation vessel which is stirred at approximately 350 rpm. The resulting precipitation suspension is transferred continuously via an overflow into a collecting vessel which is stirred at 150 rpm. After completion of the precipitation, the resulting suspension is stirred for a further 30 min at 50° C. The suspension is filtered, washed nitrate-free with deionized water, and then dried for 16 h at 120° C. The resulting product is calcined for 2 h under air at 400° C.

Preparation of the Cu—Zn—Al catalyst

In stage II of the catalyst preparation, the Zn—Al—mixed oxide prepared as described above (atomic ratio of Zn:Al=12:10) is deflocculated and suspended with partial solution in a nitric acid solution of copper nitrate and zinc nitrate (atomic ratio of Cu:Zn=65:13). The amounts of Zn—Al mixed oxide and copper zinc nitrate solution are chosen in such a manner that the suspension has a total atomic ratio of Cu:Zn:Al=65:25:10. The Cu—Zn suspension and a 20% strength by weight $Na_2CO_3$ solution are introduced from separate reservoirs into a 500 ml precipitation pot in such a manner that parallel precipitation of the copper zinc aluminum carbonate hydroxide is performed at a constant pH of from 6.7 to 6.9 and at a constant 70° C. The precipitation is performed in a 500 ml precipitation vessel which is stirred at approximately 350 rpm. The resulting precipitation suspension is continuously transferred via an overflow to a collecting vessel, which is stirred at 150 rpm. After completion of the precipitation, the resulting suspension is stirred for a further 60 min at 70° C. The suspension is filtered, washed nitrate-free with deionized water and then dried for 16 h at 120° C. The resulting product is calcined for 4 h under air at 300° C.

The material (gross catalyst composition based on oxides: approximately 67% by weight of CuO, 26.4% by weight of ZnO, 6.6% by weight of $Al_2O_3$) is then admixed with 2% of graphite, compacted in an eccentric press to form solid tablets (20 mm×3 mm) and the solid tablets are comminuted to form chippings of a grain size fraction of 1.6–2.5 mm. The catalyst has a BET surface area of 85 $m^2/g$. Total pore volume is 0.29 ml/g.

Catalyst tests

The resulting catalysts, to determine their activity, were placed as chippings (1.6–2.5 mm fraction) in a differential circulating test reactor. In all experiments, 10 ml of catalyst packing, diluted in 40 ml of inert material (steatite spheres) were put into the test reactor (dimensions of the catalyst bed (with inert material): height approximately 18 mm; diameter approximately 60 mm). The catalysts were reduced with hydrogen gas (1% $H_2$ in $N_2$) at 200° C. The catalysts were then treated with steam/methanol mixture (250 ml/h mixture: molar ratio: 1.5 mol of $H_2O$:1 mol of MeOH) (pressure: 3 bar absolute). The steam/methanol mixture was evaporated in a preliminary evaporator and then passed over is the catalyst. The catalyst activity was determined at 230 and 260° C. For this purpose, the total amount of dry gas obtained, after removal of the volatile constituents water and methanol, was determined. The composition of the dry gas, and, in particular, the hydrogen concentration in the dry gas, was determined by GC analysis. From the total amount of gas, the hydrogen concentration determined and the catalyst volume used, the hydrogen production rate was then calculated as a measure of catalyst activity. The hydrogen production rate indicates the amount of hydrogen which is produced from the methanol/steam mixture at the respective temperature on one liter of catalyst per h.

In the standard experimental procedure, the catalyst was operated for 2 h at 200° C. (no analysis), then for 2 h at 230° C. (first determination of activity after this period of 2 h), then for 2 h at 260° C. (second determination of activity) and then for a further 2 h at 260° C. (third determination of activity after this period of 2 h). The following hydrogen production rates were obtained (in l(S.T.P.)/lcat.h):

Catalyst 1 (comparative example):
after 1 h at 230° C.: 7.7 l(S.T.P.)/lcat.h
after 2 h at 260° C.: 10.5 l(S.T.P.)/lcat.h
after 4 h at 260° C.: 9.8 l(S.T.P.)/lcat.h Catalyst 2 (according to the invention):
after 2 h at 230° C.: 8.9 l(S.T.P.)/lcat.h
after 2 h at 260° C.: 12.0 l(S.T.P.)/lcat.h
after 4 h at 260° C.: 11.6 l(S.T.P.)/lcat.h The catalyst according to the invention features higher initial activity and retains its activity advantage over the entire period of the experiment.

We claim:

1. A process for steam-reforming methanol, in which methanol and water are reacted in the presence of a catalyst with formation of hydrogen, wherein the catalyst is prepared by (a) precipitating a solution of zinc salts and aluminum salts, the atomic ratio of Zn:Al being from 3:1 to 1:3, with an alkali metal carbonate solution or alkali metal hydroxide solution at a pH in the range from 5 to 12 and at from 20 to 100° C., (b) separating off and washing the precipitate to remove alkali metal ions, (c) drying the precipitate, (d) calcining the precipitate at from 250 to 800° C. to give a mixed oxide, (e) dispersing the mixed oxide in an acidic solution of copper salts and zinc salts, the atomic ratio of Cu:Zn being from 1:5 to 20:1 in the solution, (f) precipitating the dispersion with an alkali metal carbonate solution or alkali metal hydroxide solution at a pH in the range from 6 to 9 and at from 20 to 100° C., (g) carrying out the steps (b) to (d) with the precipitate of step (f), wherein the calcination step is performed at from 200 to 800° C.

2. A process as claimed in claim 1, wherein the atomic ratio of Cu:Zn is from 1:5 to 5:1 and of (Cu+Zn):Al is from 99:1 to 70:30 in the catalyst.

3. A process as claimed in claim 1, wherein the zinc salts, aluminum salts and/or copper salts are nitrates.

4. The process of claim 1 wherein the solutions in steps (a) and/or (e) contain the salts or oxides of one or more elements selected from the group consisting of platinum metals, groups 4, 5, 11 and the lanthanides of the Periodic Table.

5. The process of claim 1 wherein the salts or oxides of one or more elements selected from the group consisting of platinum metals, groups 4, 5, 11 and the lanthanides of the Periodic Table of the elements is applied to the mixed oxides.

6. A catalyst prepared by
   (a) precipitating a solution of zinc salts and aluminum salts, the atomic ratio of Zn:Al being from 1.1:1 to 3:1, with an alkali metal carbonate solution or alkali metal hydroxide solution at a pH in the range from 5 to 12 and at from 20 to 100° C.,
   (b) separating off and washing the precipitate to remove alkali metal ions,
   (c) drying the precipitate,
   (d) calcining the precipitate at from 250 to 800° C. to give a mixed oxide,
   (e) dispersing the mixed oxide in an acidic solution of copper salts and zinc salts, the atomic ratio of Cu:Zn being from 1:5 to 20:1 in the solution,
   (f) precipitating the dispersion with an alkali metal carbonate solution or alkali metal hydroxide solution at a pH in the range from 6 to 9 and at from 20 to 100° C.,
   (g) carrying out the steps (b) to (d) with the precipitate of step (f) wherein the calcination is performed at from 200 to 800° C.

7. A catalyst as claimed in claim 6, wherein, in step (a), the atomic ratio of Zn:Al is from 1.2:1 to 3:1.

8. A catalyst as claimed in claim 6, wherein the atomic ratio of Cu:Zn is from 1:5 to 5:1 and (Cu+Zn):Al is from 99:1 to 70:30.

9. A catalyst as claimed in claim 6, wherein the catalyst is present in the form of tablets having a diameter in the range from 0.8 to 5 mm and a height in the range from 0.8 to 5 mm.

10. The catalyst of claim 6 wherein the solutions in steps (a) and/or (e) contain the salts or oxides of one or more elements selected from the group consisting of platinum metals, groups 4, 5, 11 and the lanthanides of the Periodic Table.

11. The process of claim 6 wherein the salts or oxides of one or more elements selected from the group consisting of platinum metals, groups 4, 5, 11 and the lanthanides of the Periodic Table of the elements is applied to the mixed oxides.

12. A process for preparing a catalyst for steam-reforming methanol, in which methanol and water are reacted which comprises,
    (a) precipitating a solution of zinc salts and aluminum salts, the atomic ratio of Zn:Al being from 1.1:1 to 3:1, with an alkali metal carbonate solution or alkali metal hydroxide solution at a pH in the range from 5 to 12 and at from 20 to 100° C.,
    (b) separating off and washing the precipitate to remove alkali metal ions,
    (c) drying the precipitate,
    (d) calcining the precipitate at from 250 to 800° C. to give a mixed oxide,
    (e) dispersing the mixed oxide in an acidic solution of copper salts and zinc salts, the atomic ratio of Cu:Zn being from 1:5 to 20:1 in the solution,
    (f) precipitating the dispersion with an alkali metal carbonate solution or alkali metal hydroxide solution at a pH in the range from 6 to 9 and at from 20 to 100° C.,
    (g) carrying out the steps (b) to (d) with the precipitate of step (f) wherein the calcination is performed at from 200 to 800° C.

13. The process of claim 12 wherein the solutions in steps (a) and/or (e) contain the salts or oxides of one or more elements selected from the group consisting of platinum metals, groups 4, 5, 11 and the lanthanides of the Periodic Table.

14. The process of claim 12 wherein the salts or oxides of one or more elements selected from the group consisting of platinum metals, groups 4, 5, 11 and the lanthanides of the Periodic Table of the elements is applied to the mixed oxides.

* * * * *

UNITED STATES PATENT AND TRADEMARK OFFICE
CERTIFICATE OF CORRECTION

PATENT NO. : 6,051,163
DATED : April 18, 2000
INVENTOR(S) : Otto Kumberger, et al.

It is certified that error appears in the above-indentified patent and that said Letters Patent is hereby corrected as shown below:

Column 7, claim 9, line 45, delete "present".

Signed and Sealed this

Twenty-seventh Day of March, 2001

Attest:

NICHOLAS P. GODICI

Attesting Officer

Acting Director of the United States Patent and Trademark Office